Feb. 15, 1944. F. W. AVILA 2,341,756
CLUTCH CONTROL MEANS
Filed Feb. 23, 1942 3 Sheets-Sheet 2
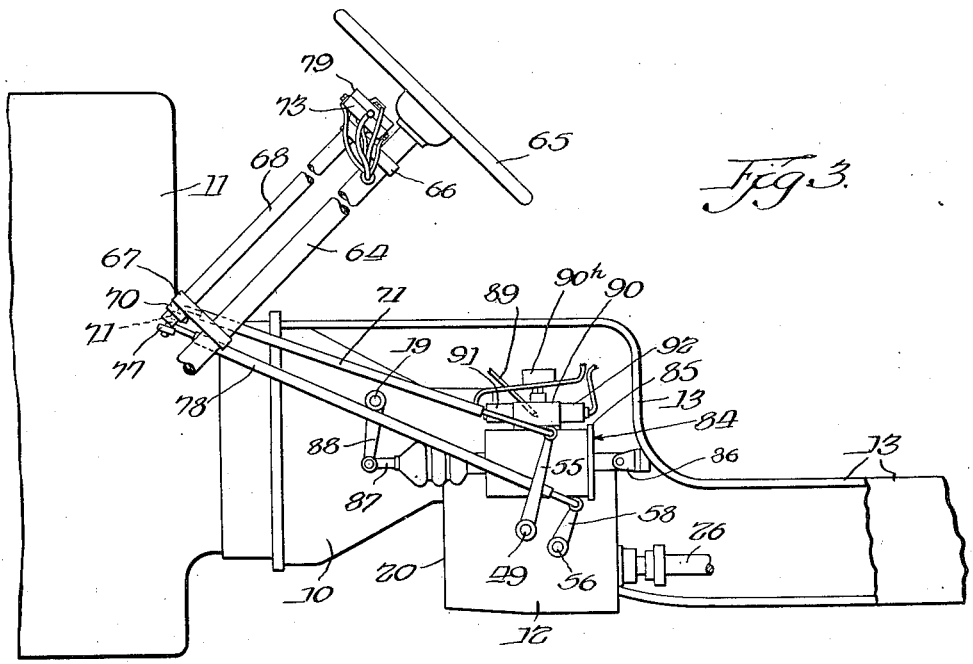
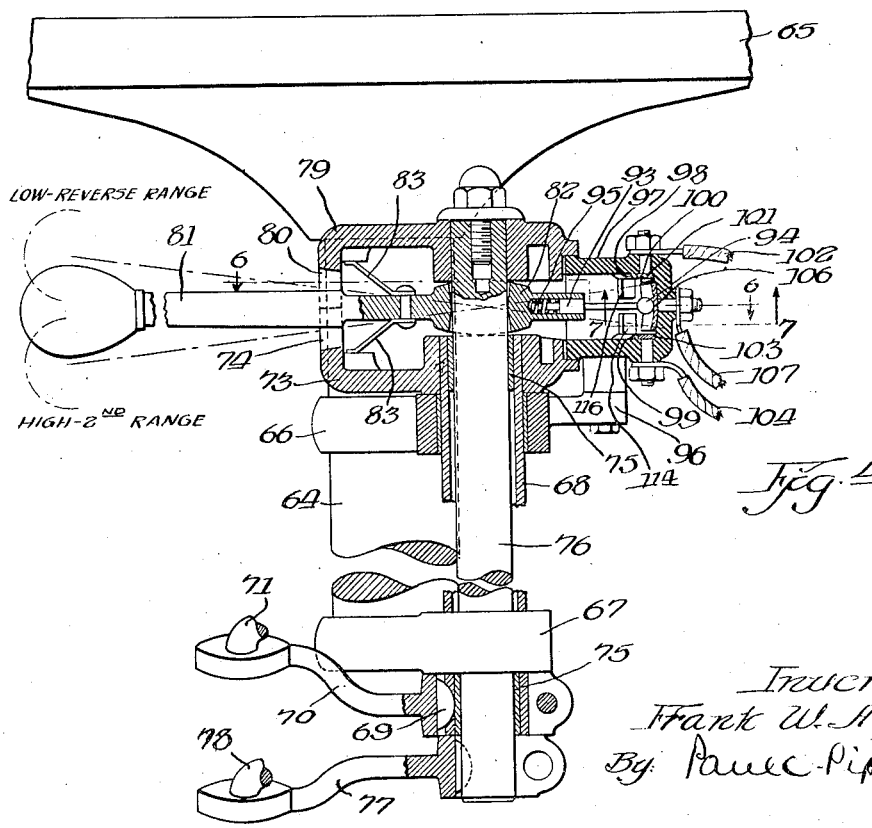
Inventor:
Frank W. Avila
By Paul Pippel
Atty.

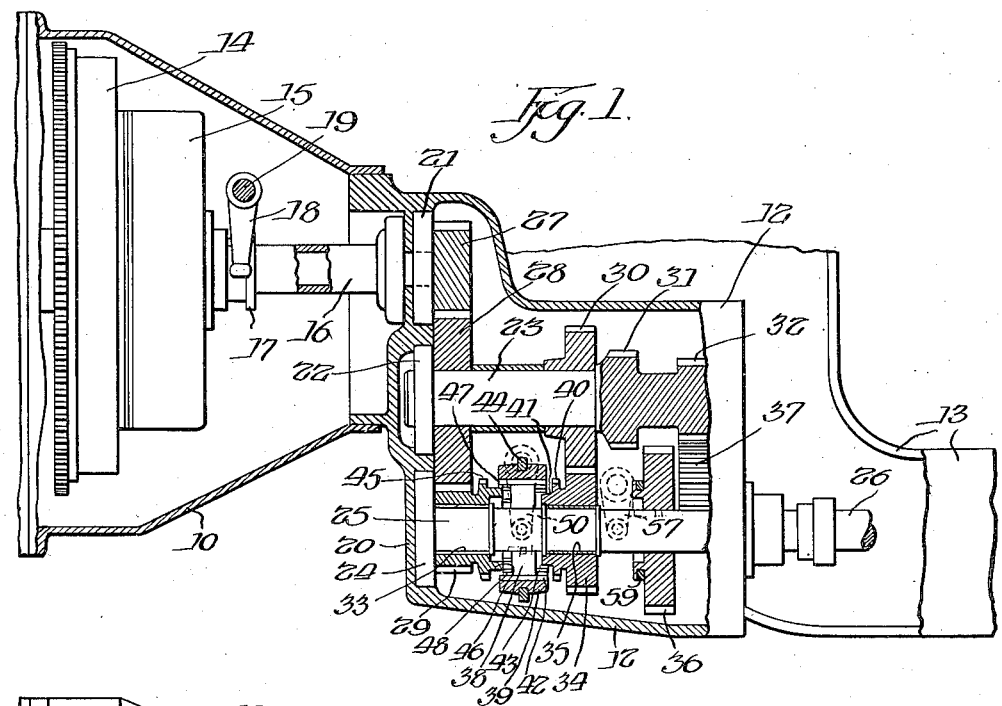

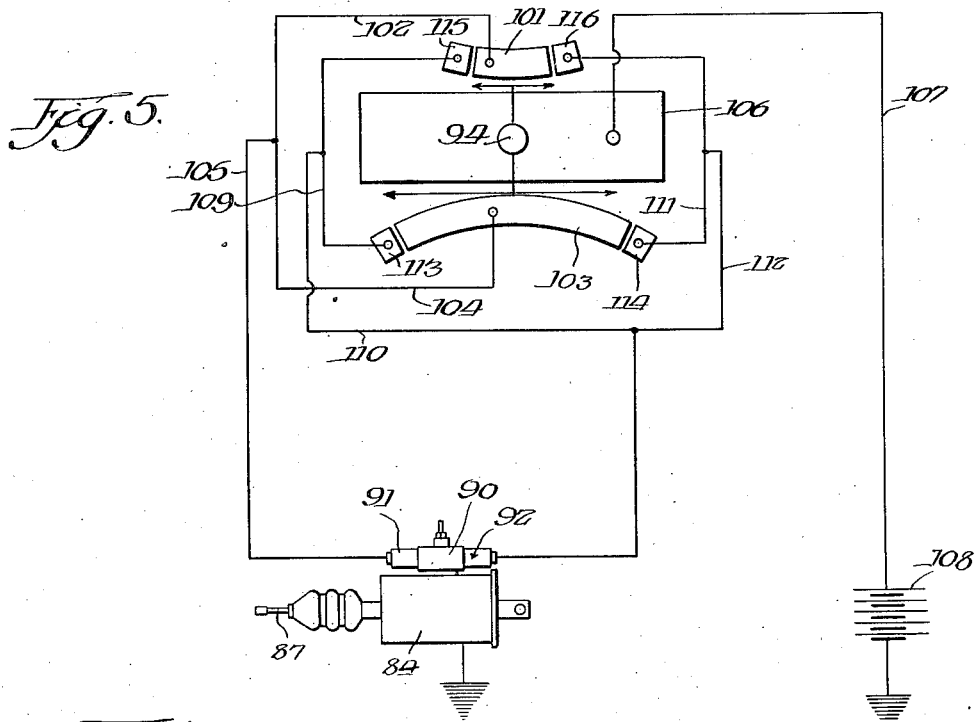
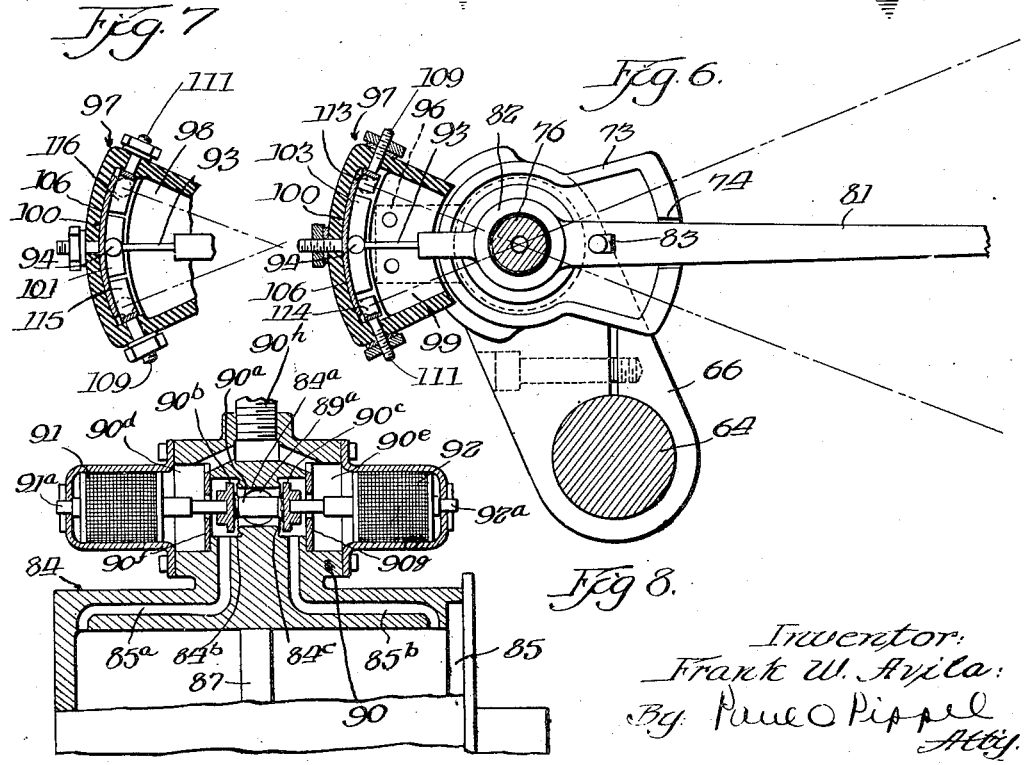

Patented Feb. 15, 1944

2,341,756

UNITED STATES PATENT OFFICE 2,341,756

CLUTCH CONTROL MEANS

Frank W. Avila, Fort Wayne, Ind., assignor to International Harvester Company, a corporation of New Jersey Application February 23, 1942, Serial No. 431,968

1 Claim. (Cl. 192—3.5)

This invention relates to controlling mechanism for the drive mechanism of a vehicle and, more particularly, to a means for automatically controlling the vehicle clutch in conjunction with the selection of speed ratios in the vehicle transmission.

It has heretofore been a common expedient in vehicles to provide means for automatically disengaging and reengaging the master or engine clutch. Such means has consisted, for example, of control devices actuated by release of the accelerator pedal, of operation of speed responsive means, and of means responsive to the manual selection of speed ratios in the transmission. Devices of the last-mentioned type are responsive to manual selection of speed ratios in either of two manners, whether the speed ratio be selected totally manually or whether the speed ratio be selected by manual operation of a device which utimately actuates a further device or devices for finally selecting the transmission speed ratios, one form of such device being the so-called "electrical hand."

According to the present invention, the control of the vehicle clutch is made dependent upon operation of the means for selecting speed ratios in the transmission. Particularly, the clutch is caused to be disengaged during the selection of a speed ratio and is subsequently caused to be positively reengaged after the speed ratio has been ultimately selected.

Still more particularly the present invention provides means by which the clutch is controlled automatically through electrical circuits including switches actuated by movement of the lever or other member that is provided to select transmission speeds. An important advantage provided by the present invention over prior devices of similar types is that the clutch is caused to be disengaged by movement of the gear-selecting member to any position except that position in which a speed ratio is ultimately selected or established.

The principal object of the present invention is to provide means for automatically controlling the engagement and the disengagement of the clutch of a vehicle.

An important object is to provide means whereby this control is made dependent upon the selection of speed ratios in the vehicle transmission.

Another important object is to provide means whereby the control member for selecting speeds in the transmission serves also as a control member, the actuation of which also controls the engagement and disengagement of the clutch, these parts being so related that the clutch cannot be reengaged except when the gear-selecting member is in either its neutral or any one of its alternate gear-selecting positions.

Another important object of the invention is the provision of electrical control means for the achievement of the foregoing objects.

The invention seeks as another object to accomplish the foregoing objects in conjunction with any form of gear-selecting device and particularly in conjunction with a remote control gear-selecting means, such as is now commonly mounted on the steering column of a vehicle.

And, another object is the provision of electrical switch means actuated by movement of the gear-selecting device or member and consisting of terminals interposed in two circuits, one of which controls the disengagement of the clutch and the other of which controls reengagement of the clutch, the switch means and terminals being so arranged that the circuits must be separately closed and that ultimate gear selection is necessary before there can be a closing of the circuit that controls the reengagement of the clutch.

The foregoing and other desirable objects and features of the present invention may be accomplished in one preferred form of the invention, as described in detail in the following specification and as illustrated in the accompanying sheets of drawings, in which:

Figure 1 is a longitudinal sectional view of one type of driving mechanism in conjunction with which the invention may be used, the view illustrating the engine clutch and transmission;

Figure 2 is a plan view, partly in elevation, of the structure shown in Figure 1;

Figure 3 is a side elevational view of a portion of a vehicle showing the drive mechanism housing in conjunction with an engine and as associated with the means for selecting speed ratios in the transmission and the means for controlling the clutch;

Figure 4 is an enlarged sectional view of the gear-selecting mechanism shown in Figure 3, the illustration being a section as viewed from the front of the vehicle;

Figure 5 is a wiring diagram of the electrical circuits included in the mechanism by which the actuation of the clutch is controlled;

Figure 6 is a transverse sectional view, taken on the line 6—6 of Figure 4, as viewed from above and to the rear of the assembly;

Figure 7 is a fragmentary sectional view, taken on the line 7—7 of Figure 4, as viewed from below and to the rear of the assembly; and, Figure 8 is an enlarged sectional view of one form of valve-operating means for controlling the power means.

Although the drawings illustrate and the description will pertain to particular types of driving mechanism and the control therefor, it will be understood that the invention in its broadest aspects is adaptable to like structures of any type and may be suitably used in conjunction with devices of any form.

The particular type of driving mechanism illustrated consists of a housing 10 formed in the usual manner as an extension of the vehicle power plant or engine, this latter being generally indicated by the numeral 11. The rearward end of the housing 10 is associated in any suitable manner with the forward end of a second housing 12. The engine and the two housings are suitably supported in any conventional manner between the side frame members of the vehicle frame or chassis 13. As best shown in Figure 1, the housing 10 constitutes the clutch housing enclosing a master engine clutch 14. This clutch may be of any conventional type and is, therefore, illustrated only generally. The driven clutch part, indicated at 15, carries in the usual manner a rearwardly extending driveshaft 16. A throw-out collar 17 is journaled on the shaft 16 and may be moved axially with respect thereto for the purpose of engaging and disengaging the parts of the clutch 14, all in the usual manner. As illustrated in the drawings, there is provided a throw-out fork 18 keyed to a transverse rock-shaft 19. The fork is actuated by rocking of the shaft 19, as will hereinafter more fully appear. The housing 12 comprises a transmission housing and includes a forward wall 20 carrying at an upper portion an antifriction bearing 21 which serves to journal the rearward end of the clutch or drive-shaft 16. The wall 20 carries a second antifriction bearing 22 spaced below the bearing 21 and journaling the forward end of a transmission counter-shaft 23, the rearward end of which is journaled in any suitable manner in the rearward portion of the housing 12. A third antifriction bearing 24 is carried in the lowermost portion of the housing 12 and rotatably supports the forward end of a power out-put shaft 25. The rear end of the shaft is suitably journaled in and extends outwardly beyond the lower rearward portion of the housing, as at 26. The shaft part 26 serves as the power shaft which may be connected to a conventional propeller shaft for the vehicle.

The clutch or drive-shaft 16 carries within the housing 12 a gear 27. This gear is constantly in mesh with a gear 28 keyed to the counter-shaft 23. The gear 28 is in turn in constant mesh with a gear 29 on the power shaft 25. The shaft 23 carries a plurality of other gears keyed thereto. Rearwardly spaced from the gear 28 is a second or intermediate speed gear 30, next, a first or low speed gear 31, and, finally, a reverse gear 32. As shown in the drawings, the gears 31 and 32 are preferably formed as integral parts of the shaft 23. The gear 29 is rotatable with respect to the shaft 25, the gear being journaled on the shaft through the medium of a bushing or bearing 33 and, consequently, rotation of the gear 29 through the medium of the gears 27 and 28 will normally not drive the power shaft 25. The gear 29 consists of a constant-mesh third or high speed gear, the function of which will hereinafter appear. A gear 34, which is the second or intermediate gear, is carried on the shaft 25 for rotation with respect thereto, being journaled on a bushing or bearing 35. This gear is in constant mesh with the second speed gear 30 on the counter-shaft 23. A third gear in the form of a first or low speed gear 36 is keyed to the shaft 25 for rotation therewith and is axially shiftable with respect to the shaft. The gear 36 may be shifted forwardly (as viewed in Figure 1) to mesh with the gear 31 on the shaft 23, thus establishing low or first speed to the power shaft 25, or it may be shifted rearwardly to mesh with a reverse gear 37 for driving the power shaft 25 in reverse. It will be understood, of course, that the reverse gear 37 is in constant mesh with the reverse gear 32 on the counter-shaft 33.

The means for accomplishing the shifting from neutral to second and third speeds is of the so-called synchronizing type. As shown in Figure 1, there is provided a synchronizing unit consisting of an inner member 38 carried by the shaft 25 for rotation therewith. This member is provided with an axially splined periphery, as is conventional, engaged with the axially splined inner means of a shifter ring 39. The ring 39 is shiftable axially with respect to the inner member 38, the two being held in related positions by a suitable detent means, not shown, which may be of any conventional form. The second speed gear 34 includes as an integral part thereof a toothed driving portion 40 and a conical portion 41. The toothed or splined inner periphery of the shifter ring 39, as at 42, is complementary to the toothed portion 40 on the gear 34. The inner member 38 is provided with an internal conical driving portion 43, complementary to the conical portion 41 on the gear 34. A shifter fork 44 engages the shifter ring 39 and may be actuated, as will hereinafter appear, to shift the ring axially in either direction, toward the gear 34 or toward the gear 29. When the ring is shifted toward the gear 34, it carries with it, because of the detent means (not shown), the inner member 38. The conical drive portion 43 on the member 38 engages the conical portion 41 on the gear 34, this engagement of those parts providing for the synchronizing of the speeds of the two. Continued movement of the shifter fork 44 carries with it only the ring 39, since the detent means becomes released; and the toothed portion of the ring 39 engages the toothed portion 40 on the gear 34. Since the ring and the member 38 are still splined together and, since the member 38 is keyed to the shaft 35, the shaft 25 will now be driven by the gear 34. The high speed gear 29 is provided with a toothed driving portion 45 and a conical portion 46. The ring 39 is provided with a toothed portion 47 and the member 38 is provided with a conical driving portion 48. Movement of the shifter fork 44 toward the gear 29 causes shifting engagement between the portions 48 and 46 and subsequently engagement between the portions 47 and 45 of the parts 38 and 29, respectively. In this manner the shaft 25 is connected to the gear 29 and is driven thereby. The foregoing description pertains to a transmission in which the speeds are selected in a conventional manner. Since the present invention is adaptable to any type of transmission, the particular form illustrated has not been described in great detail, these details being obvious to those versed in the art.

As best shown in Figures 2 and 3, the housing 12 carries a transversely extending rock-shaft 49 extending outside of the left side of the housing. The inner end of the rock-shaft 49 has keyed thereto a downwardly depending lever 50, the lower end of which is engaged with the shifter fork 44. The fork is supported on and is slidable with a shifter rod 51, opposite ends of which are slidably carried in portions 52 and 53 of the housing 12. The end of the rod 51 in the portion 53 is provided with three detent notches engageable in the usual manner by a detent 54.

The detent means and notches are engageable in the various positions of the shifter fork 44. The outer end of the rock-shaft 49 has keyed thereto an upstanding arm or lever 55, the connection of which to the control means will be presently described. The housing 12 carries a second transverse rock-shaft 56, the inner end of which has keyed thereto a depending arm 57. The outer end of the rock-shaft has keyed thereto an upstanding arm or lever 58. The means for controlling the arm 58 will be described in combination with the description of the control means for the transmission. The lower part of the arm 57 inside the housing 12 is pivotally connected to a shifter fork 59, which is in turn associated with a collar formed on the low and reverse shiftable gear 36. The fork is supported on and slidable with a shifter rod 60 carried at opposite ends in supporting portions 61 and 62 in the housing 12. A detent means 63 is engageable with any one of three notches provided in the rod 60. This rod is shiftable or slidable during selection of first and reverse speed ratios.

As best shown in Figure 3, the vehicle includes an upwardly and rearwardly extending steering column 64 having at its upper end a steering wheel 65 of any suitable type. The steering column carries at axially spaced points thereon upper and lower supporting brackets 66 and 67. These brackets serve to journal a sleeve 68 which parallels the steering column 64. The lower end of the sleeve 68 has keyed thereto by means of a key 69 a generally transversely extending arm 70, the outer end of which has pivotally connected thereto the forward end of a shifter link 71. The rearward end of the link 71 is connected to the upper end of the arm 55, this arm being previously described as being mounted on the rock-shaft 49 and operable to shift the shifter fork for the selection of intermediate and high speed ratios in the transmission. The upper end of the shifting sleeve 68 extends slightly upwardly from the upper supporting bracket 66 and has keyed thereto a member 73. This member extends to the right-hand side of the sleeve 68 (to the left as viewed in Figure 4) and is provided with a slot 74 paralleling the axis of the sleeve. The member 73 is, of course, rockable about the axis of the sleeve and with the sleeve as the sleeve is rocked to actuate the arm 55 and the shifter fork 44, further details of which will appear below.

Within the sleeve 68 there is journaled, by means of bushings 75, a shifter shaft 76, the lower end of which extends downwardly below the lower end of the sleeve 68 and has keyed thereto one end of a transversely extending shifter arm 77. The outer end of the arm is pivotally connected to the forward end of a shifting link 78, the rearward end of which is pivotally connected to the upper end of the arm 58 on the rock-shaft 56, previously described as operable to shift the first and reverse speed gear 36. The upper end of the shifter shaft 76 extends upwardly beyond the upper end of the sleeve 68 and has keyed thereto a member 79 very similar to the member 73. The members 73 and 79 are reversed and are complementary with respect to each other. The member 79 is provided with a slot 80 corresponding to the slot 74 in the member 73. A gear-shifting member or lever 81 is rockably and rotatably carried at its inner end, as at 82, on an upper portion of the shifter shaft 76. This lever extends transversely to the right side of the steering wheel 65 (to the left, as viewed in Figure 4). The lever is rockable about the axis of the shifter shaft and is also rockable about an axis at right angles to the axis of the shifter shaft. Means in the form of a pair of spring members 83 are carried by the lever 81 and serve to maintain the lever in a transverse horizontal position, the spring members respectively engaging the members 73 and 79. The lever in this position is in a neutral position, passing through both slots 74 and 80. As indicated in broken lines in Figure 4, the lever 81 may be rocked upwardly or downwardly to completly engage either of the slots 80 or 74. When the lever is engaged with one slot, it is disengaged from the other slot, and thus the lever may be positioned for engagement with either of the members 73 or 79. When the lever is moved upwardly to engage the slot in the member 79 and is then moved forwardly or rearwardly, the member 79 is rocked about its axis. Assuming that the lever 81 is first lifted upwardly into engagement with the slot 80 in the member 79 and then is moved rearwardly or toward the driver, the member 79 will be rotated in a clockwise direction (as viewed from above). The shaft 76 will then impart this motion to the arm 77, which in turn will move the arm 58 rearwardly and rock the rock-shaft 56 in the rock-shaft 12, also in a clockwise direction. This movement shifts the shifter fork 59 forwardly and brings the first speed gear 36 on the shaft 25 into engagement with the gear 31 on the shaft 23. The transmission is then operated in first or low gear. When the driver moves the lever 81 forwardly, still maintaining it in its upper position, the member 79 is moved angularly in a counter-clockwise direction, the movement resulting in shifting of the gear 36 into engagement with the reverse idler gear 37 in the transmission, thus operating the transmission in reverse speed.

When the lever 81 is moved downwardly, it becomes engaged with the slot 74 in the member 73. In this position the lever may be moved either forwardly or rearwardly to select either a second or high speed ratio in the transmission, this movement effecting operation of the connections including the arms 55 and 70 and the link 71, causing a shifting of the synchronizing unit 38—39.

According to the present invention, means are provided for controlling the clutch in accordance with the selection of speeds in the transmission. In a preferred form of device the clutch is controlled by a power means preferably in the form of a pressure differential device or vacuum motor. Such a device is indicated in Figure 3 at 84. This device may be of any well known construction and is, therefore, illustrated only generally. As shown in the drawings, the device consists of a cylinder 85 pivotally attached to a bracket 86 carried by the vehicle frame. The device includes a reciprocating piston 87 pivotally connected at its outer end to an arm 88 keyed to the transverse rock-shaft 19 which controls the engine clutch 15. Actuation of the piston in either direction in the device is accomplished in the usual manner by manifold vacuum. A vacuum line 89 is indicated in Figure 3, this line being connected in any suitable manner to the engine manifold, not shown. The vacuum to the cylinder 84 is controlled through a two-way valve means indicated generally at 90. Such valve means may be of any conventional design, the structure shown in the drawings being merely representative. The valve means includes a body portion 90a having a pair of spaced valve members 90b and 90c. The body portion is extended at opposite sides of the valve members 90b and 90c to provide two portions associated respectively with solenoid cores 91a and 92a, which cooperate respectively in the well-known manner with the solenoids 91 and 92. In a manner that will be hereinafter described, the entire valve structure is adapted to be shifted back and forth in the housing included in the valve means. This housing is formed with a central bore 84a formed on the axis of reciprocation of the valve structure. Opposite ends of this bore provide seats 84b and 84c against which the valve members 90b and 90c, respectively, are adapted to seat. The vacuum line 89, previously referred to, communicates through an opening 89a with the bore 84a. At each end thereof the bore 84a is enlarged to accommodate the respective valve members 90b and 90c. A passage 85a communicates with one enlarged end of this bore and one end of the cylinder 85. A similar passage 85b communicates with the other enlarged end of the bore and with the other end of the cylinder. Vacuum applied through the line 89 and bore 89a controls the operation of the piston 87 in the cylinder, the valve members 90b and 90c being operated to direct the vacuum to either end of the cylinder as desired.

The housing or body which carries the valve structure just described is provided at each end with chambers 90d and 90e. The chamber 90d is separated from the enlarged end of the bore 84a by means of an apertured plate 90f. A similar plate 90g is disposed between the other chamber and the other end of the bore 84a. As will be apparent from the structure shown in Figure 8, the apertures in the plates 90f and 90g are adapted to be opened or closed by the valve members 90b and 90c, respectively. The arrangement just described provides a two-way valve structure adapted to control a plurality of passages. Each of the chambers 90b and 90e is in communication with an air inlet 90h. Communication between the air inlet and the ends of the cylinder 85 is had through the chambers 90d or 90e and the passages 85a or 85b, depending upon the position of the valve members 90b and 90c. In operation, the solenoid 91, for example, is energized, with the result that the valve body 90a is moved to the left, as viewed in Figure 8. With the parts in this position, the valve member 90b closes the aperture in the divider plate 90f and opens the seat 84b in the bore 84a. Hence, the left-hand end of the cylinder 85 is open to vacuum, which is then applied through the vacuum line 89, bore 89a, valve seat 84b and passage 85a. At the same time, the valve 90c closes the seat 84c and opens the aperture in the divider plate 90g at the right-hand side of the assembly. Thus, the right-hand end of the cylinder 85 is open to atmosphere through the passage 85b, chamber 90e, and air inlet 90h. The piston 87 then moves to the left.

It will be understood that the valve parts, as shown in Figure 8, are in a neutral position. The control of the means for the moving of the piston 87 to the right will be apparent from the foregoing description, the valve body 90b being then moved to the right to connect the appropriate passages with air and vacuum. The solenoid 91 controls the valve 90 for actuation of the piston 87 to the right, as viewed in Figure 1, for the purpose of disengaging the engine clutch 15. The solenoid 92 operates the valve 90 for the actuation of the piston in the opposite direction for reengagement of the clutch.

The following description pertains to the electrical control means for the solenoids 91 and 92. As best shown in Figures 4, 6, and 7, the end of the shifter lever 81 opposite the handle portion thereof is provided with an axial bore in which is slidably carried a contact member 93. This member has a portion extending coaxially from one end of the shifter lever 81, which portion is formed with a ball member 94. A coil spring 95, carried within the axial bore in the shifter lever, urges the contact member 93 outwardly. The upper supporting bracket 66, which carries the vertical shifter shafts on the steering column 64, includes an extension 96. This extension serves to support a housing 97. This housing is generally U-shaped in cross-section and includes arcuate upper and lower walls 98 and 99 and a cylindrical inner wall 100 disposed at right angles to and connecting said first walls. The inner portion of the housing is open toward the shifter lever 81 and encloses the contact member 93. The upper wall 98 of the housing 97 carries rigidly thereon an arcuate terminal plate 101 connected by an electrical conduit or lead 102. The lower wall 99 of the housing 97 carries an arcuate terminal plate 103 connected to an electrical lead 104. These leads are connected to a common conductor or lead 105, which is in turn connected to the solenoid 91. The wall 100 of the housing 97 carries a curved terminal plate 106 connected by a lead-wire 107 to a source of electrical energy such as the vehicle battery, a representation of which appears at 108 in Figure 5. There is thus provided an electrical circuit which includes the solenoid 91 and the terminals 101, 103, and 106. This circuit is normally open and may be closed by operation of the gear shift lever 81, this lever in conjunction with the terminals comprising switch or control means for the solenoid 91. As best indicated in Figure 4, the shifter lever 81 may be moved upwardly or downwardly prior to the selecting of the desired range of movement thereof. When the lever is moved upwardly to select the low-reverse range, the contact ball 94 on the inner end of the lever is moved downwardly and into contact with a portion of the terminal plate 103. The ball member 94 is constantly in contact or in engagement with the curved terminal plate 106. Engagement between the ball and the plate 106 is insured by outward pressure of the coil spring 95 carried within the axial bore at the inner end of the lever 81. With the parts in the position just related, the ball 94 serves to connect electrically the terminal plates 103 and 106, thus closing the circuit between the battery 108 and the solenoid 91. As best shown in Figure 6, the contact ball 94 remains in contact with the terminal plates 103 and 106 throughout the movement of the lever 81 toward either low or reverse positions. These positions of the lever are indicated schematically in broken lines in Figure 6. Since the ball 94 remains in constant contact with these two terminal plates, the circuit controlling the solenoid 91 remains closed and the pressure device 84 is under pressure or functions to maintain the piston 87 to the right for the purpose of maintaining the engine clutch in disengaged position.

The housing 97 further carries at one end a pair of terminals 113 and 115 and at its opposite end, a pair of terminals 114 and 116. The terminals 113 and 115 are connected by a lead 109 to a lead 110, which is in turn connected to the solenoid 92. The terminals 114 and 116 are connected through a lead 111 to a lead 112, which, like the lead 110, connects with the solenoid 92. As best shown in Figure 6, the terminal 113 is spaced or insulated from one end of the terminal plate 103, and the terminal 114 is spaced or insulated from the other end of the terminal plate 103. When the ball member 94 on the first lever 81 moves off the end of the terminal plate 103, the circuit including the solenoid 91 is broken and a new circuit is made. Since the ball 94 has remained in connection with the terminal plate 106, a complete circuit is made through the terminal 113 to the solenoid 92. In the operation of the parts as just stated, th shifter lever 81 has been moved to select low gear in the transmission. The terminal 113 coincides substantially with the ultimate selection of that gear, and, when that gear has been selected, the circuit to the solenoid 92 is closed, thus causing an actuation of the device 84 to move the piston 87 to the left for engaging the engine clutch. The selection of low gear and reengagement of the engine clutch are substantially simultaneous, but there is a sufficient time lag or interval to insure complete engagement of the low speed gears 31—36 before reengagement of the clutch.

The terminal 114 is similarly disposed coincident with the position of the shift lever 81 after reverse gear has been selected. The control of the solenoid for reengaging of the clutch is similar to the control thereof as described above, the terminals 113 and 114 being in the same circuit.

When the shifting lever 81 is moved downwardly for movement through the high-second range, the ball 94 electrically connects the terminal plates 101 and 106, causing control of the solenoid 91 to disengage the engine clutch just as in the case of movement of the shift lever upwardly as described above. The terminal 115 coincides with the position of the contact ball 94 when the shift lever 81 has been moved to select the high speed gear in the transmission. The terminal 116 corresponds to the position of the second speed and is engaged by the ball 94 when that speed has been selected. Since the terminals 113, 114, 115, and 116 are disposed in the circuit with the solenoid 92, this circuit may be closed by the switch means or contact ball 94 in any one of four positions, each position corresponding to a position of the shifter lever 81 after a speed ratio in the transmission has been selected.

In the operation of the vehicle the shifter lever 81 may be moved from neutral to any one of a number of positions for the selecting of gear speeds in the transmission. As indicated in the present case, the transmission is of the type having one reverse speed and three forward speeds. The contact member 94 on the end of the lever 81 is positionable during movement of the lever at various points to disengage or reengage the engine clutch. The terminal plates 101 and 103 are of lengths corresponding respectively to the distances through which the ball 94 must be moved during the selection of various speeds in the transmission. As previously stated, the terminals 113, 114, 115, and 116 correspond respectively with low, reverse, high, and second speeds in the transmission. During movement of the lever 81, while a speed change is being made, the engine clutch is automatically disengaged, because the switch means, including the contact ball 94, operates between the terminal plates 106 and either of the terminal plates 101 and 103 to close the circuit to the solenoid 91. After any one of the speeds in the transmission has been ultimately selected, the clutch is reengaged, because the switch means, including the contact ball 94, operates to break the circuit to the solenoid 91 and to make a new circuit (to the solenoid 92) by virtue of the connection of the terminal 106 with any one of the terminals 113, 114, 115, or 116, depending upon which speed in the transmission has been selected.

From the foregoing description it will be seen that the engine clutch is actuated by the gear shift means in such a manner that the clutch is disengaged during any position of the gear shifter lever except its neutral position or any one of its ultimate gear-selecting positions. In short, the clutch can be disengaged by a relatively slight movement of the gear shift lever 81 in either direction, upwardly or downwardly, from its neutral position. It will be further noted that an important function of the system is that the engine clutch cannot be reengaged until a transmission gear speed has been ultimately selected. Conversely, the engine clutch must necessarily be disengaged before a complete disengagement of any of the transmission gears can occur. Another feature of the invention is that there is provided a combined control of the clutch and transmission. Such a control is desirable in certain types of vehicles, especially in delivery vehicles or the like in which the operator assumes a standing position while operating the vehicle.

Certain other features of the invention will become apparent to those versed in the art. It will be also apparent that the foregoing disclosure is of only a preferred embodiment of the invention, and that numerous modifications and alterations may be made therein without departing from the spirit and scope of the invention as defined in the appended claim.

What is claimed is:

In a vehicle having a clutch, a selective speed transmission, means for selecting speeds in the transmission, and means for engaging and disengaging the clutch, electrical control means for the clutch-disengaging means, a support, a member movably carried by said support and movable by the speed-selecting means through a plurality of ranges from a neutral position to a plurality of end positions respectively corresponding to the selection of speeds in the transmission, electrical control means for the clutch-engaging means, a first open electrical circuit including said first control means, extended terminal plates in the first circuit carried by the support and slidably engaged by said member for electrical contact, a second open electrical circuit including the second control means, terminals in the second circuit respectively carried at the end positions of the support, means insulating said second-circuit terminals from the first-circuit terminals, the first-circuit terminals being selectively engageable by the member, as it is moved selectively by the speed-selecting means for the transmission, to close the circuit to the control means for the disengagement of said clutch, said member passing off a respective first-circuit terminal and onto a second-circuit terminal as it moves to a respective end position to open the first circuit and to close the second circuit to the second control means for engaging the clutch.

FRANK W. AVILA.